United States Patent
Staudenmaier et al.

(10) Patent No.: US 9,558,373 B2
(45) Date of Patent: Jan. 31, 2017

(54) 3D GRAPHICS SYSTEM USING ENCRYPTED TEXTURE TILES

(71) Applicants: Michael Andreas Staudenmaier, Munich (DE); Juergen Frank, Munich (DE); Robert Cristian Krutsch, Munich (DE)

(72) Inventors: Michael Andreas Staudenmaier, Munich (DE); Juergen Frank, Munich (DE); Robert Cristian Krutsch, Munich (DE)

(73) Assignee: NXP USA, Inc., Austin, TX (US)

( * ) Notice: Subject to any disclaimer, the term of this patent is extended or adjusted under 35 U.S.C. 154(b) by 175 days.

(21) Appl. No.: 14/563,139

(22) Filed: Dec. 8, 2014

(65) Prior Publication Data

US 2016/0162709 A1    Jun. 9, 2016

(51) Int. Cl.
| | |
|---|---|
| *G06F 21/72* | (2013.01) |
| *G06F 21/78* | (2013.01) |
| *G06T 1/20* | (2006.01) |
| *G06T 15/04* | (2011.01) |
| *G09C 5/00* | (2006.01) |
| *H04L 9/14* | (2006.01) |
| *G06F 21/85* | (2013.01) |

(52) U.S. Cl.
CPC .............. *G06F 21/72* (2013.01); *G06F 21/78* (2013.01); *G06F 21/85* (2013.01); *G06T 1/20* (2013.01); *G06T 15/04* (2013.01); *G09C 5/00* (2013.01); *H04L 9/14* (2013.01)

(58) Field of Classification Search
CPC ................................ G06T 15/04; G06T 11/001
See application file for complete search history.

(56) References Cited

U.S. PATENT DOCUMENTS

| | | | |
|---|---|---|---|
| 7,176,934 B2 * | 2/2007 | Fenney | G06F 21/121 345/422 |
| 7,594,265 B2 | 9/2009 | Wong et al. | |
| 8,503,671 B2 | 8/2013 | Chen | |

(Continued)

FOREIGN PATENT DOCUMENTS

| | | |
|---|---|---|
| GB | 2379299 A | 3/2003 |
| WO | 2013/096258 A1 | 6/2013 |

OTHER PUBLICATIONS

Shi,. W. et al., "A Digital Rights Enabled Graphics Processing System," Graphics Hardware 2006; GH '06 Proceedings of the 21st ACM SIGGRAPH/Eurographics symposium on Graphics Hardware; ACM, New York, NY, USA, pp. 17-26.

*Primary Examiner* — Barry Drennan
*Assistant Examiner* — Jason Pringle-Parker (57) ABSTRACT

A 3D graphics system uses encryption keys to decrypt received and stored texture tiles of a texture in accordance with received and stored texture tile status data which indicates whether a texture tiles is encrypted or not and which one of the encryption keys is used. The decrypted texture tiles are rendered and at least a plurality of the rendered tiles is encrypted. The encrypted rendered tiles are stored in a frame buffer. Buffer tile status data is stored which indicates whether a rendered tile is encrypted or not before storage in the frame buffer, and which one of the encryption keys has been used. The encrypted rendered tiles stored in the frame buffer are decrypted in accordance with the buffer tile status data.

20 Claims, 6 Drawing Sheets

(56) References Cited

U.S. PATENT DOCUMENTS

| | | | |
|---|---|---|---|
| 2002/0018565 A1* | 2/2002 | Luttrell | H04N 7/1675 380/217 |
| 2003/0067474 A1* | 4/2003 | Fenney | G06F 21/121 345/582 |
| 2003/0200435 A1* | 10/2003 | England | G06F 21/445 713/172 |
| 2007/0103481 A1* | 5/2007 | Fenney | G06F 21/121 345/582 |
| 2008/0046756 A1* | 2/2008 | Dempski | G06F 21/84 713/187 |

* cited by examiner

3D GRAPHICS SYSTEM USING ENCRYPTED TEXTURE TILES

FIELD OF THE INVENTION

This invention relates to a 3D graphics system, an instrument display system of a vehicle comprising the 3D graphics system, a vehicle comprising the instrument display system, a method of generating 3D graphics, a computer program product and a non-transitory tangible computer readable storage medium.

BACKGROUND OF THE INVENTION

The UK patent application GB2379299A discloses a 3D graphics system processing encrypted texture data. The graphics system has an input to receive object data for an object to be textured. The textures used by an application, especially games applications, have been created at the time the application is written. To prevent widespread duplication of the graphics software including these textures the texture data has been encrypted before distribution. The systems running the games application obtain the encrypted textures from a local memory and have a texture decryption unit to decrypt the textures on the fly for use by a render unit. The decrypted texture data generates texture image data for a frame buffer from where it can be output for display. The texture decryption unit decrypts the texture pixels by using a key based on a sales key externally supplied to the render unit. A memory encryption and decryption unit may be positioned between the memory controller and the frame memory.

A disadvantage of this prior art is that a security breach occurs as soon as the sales key and, if present, the key for encrypting the data in the frame memory becomes known.

SUMMARY OF THE INVENTION

The present invention provides a 3D graphics system, an instrument display system of a vehicle comprising the 3D graphics system, a vehicle comprising the instrument display system, a method of generating 3D graphics, a computer program product and a non-transitory tangible computer readable storage medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

FIG. 1 schematically shows an example of an embodiment of a 3D graphics system, FIG. 2 schematically shows another example of an embodiment of a 3D graphics system, FIG. 3 schematically shows a structure of a texture storage and its associated texture tile encryption status storage, FIG. 4 schematically shows a structure of a frame buffer and its associated buffer tile encryption status storage, FIG. 5 schematically shows a graphically generated instrument cluster in a vehicle, FIG. 6 schematically shows a flowchart for explaining the operation of an embodiment of the 3D graphics system, and FIG. 7 schematically shows a data carrier which comprises instructions for causing a programmable apparatus to perform the operations of the embodiment shown in FIG. 6.

DETAILED DESCRIPTION OF THE PREFERRED EMBODIMENTS

Whenever, in the following, for sake of understanding, the circuitry is described in operation, it will be apparent that the respective elements are arranged to perform the functions being described as performed by them.

Figure 1:
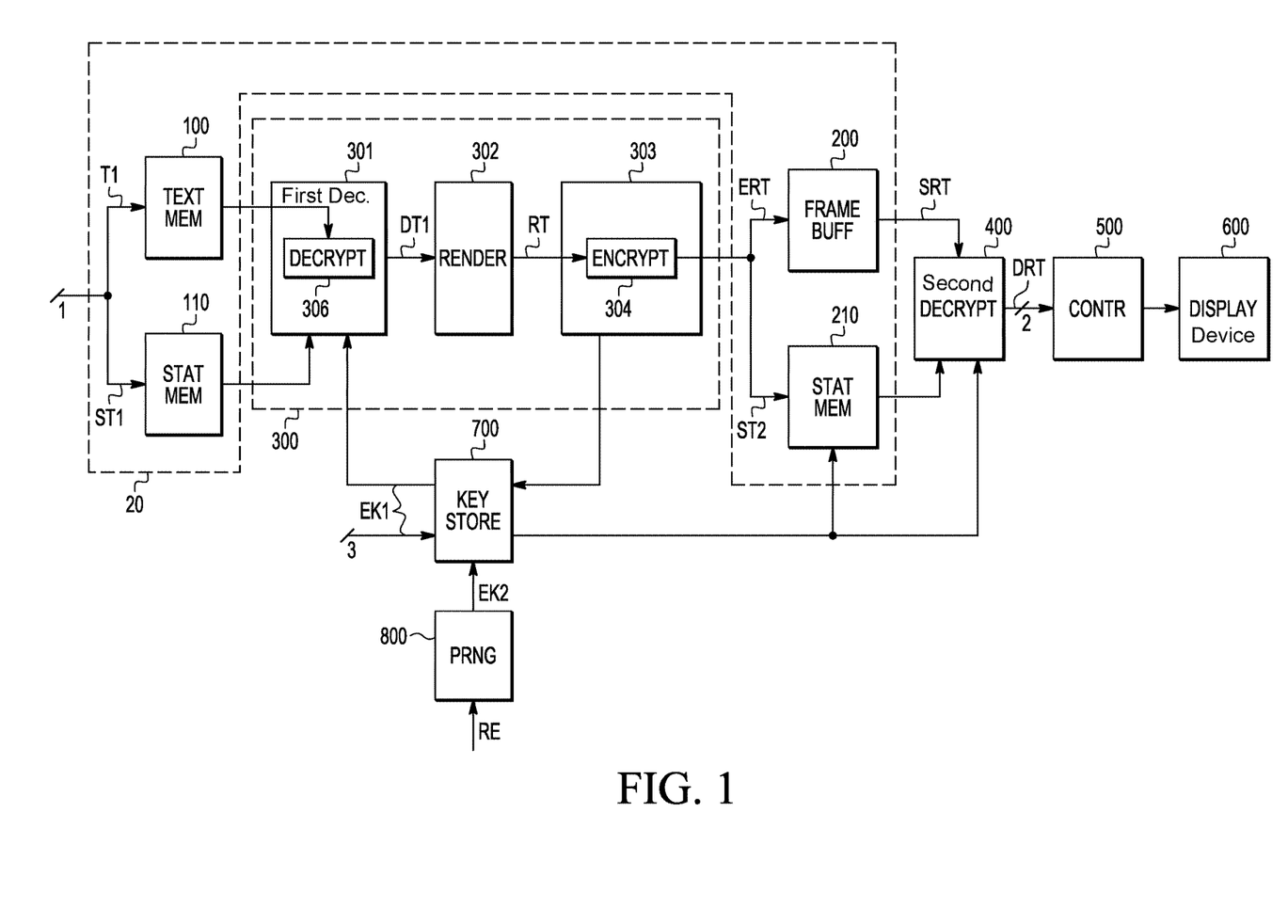

FIG. 1 schematically shows an example of an embodiment of a 3D graphics system comprising: a key storage 700 for storing encryption keys EK1, EK2, an input 1 for receiving a texture comprising tiles T1 of texture data TD and for receiving texture tile status data ST1, a texture storage 100 for storing the tiles T1 of texture data, a texture tile encryption status storage 110 for storing the texture tile status data ST1 indicating whether an associated one of the tiles T1 of texture data is encrypted or not and if encrypted which one of the encryption keys EK1 has been used, a first decryption unit 301 coupled to the texture storage 100, to the first tile encryption status storage 110 and to the key storage 700 for decrypting encrypted ones of the tiles T1 of texture data in accordance with the associated ones of the encryption keys EK1 to obtain decrypted tiles DT1 of texture data, a render unit 302 coupled to the first decryption unit 301 for rendering the decrypted tiles DT1 of texture data into rendered tiles RT, an encryption unit 304 coupled to the render unit 302, to a frame buffer 200 and to a buffer tile encryption status storage 210 for encrypting at least one of the rendered tiles RT to obtain encrypted rendered tiles ERT, for storing the encrypted rendered tiles ERT and if present the rendered tiles RT not encrypted, in the frame buffer 200 and for storing the associated buffer tile status data ST2 in the buffer tile encryption status storage 210, the buffer tile status data ST2 indicates whether an associated one of the rendered tiles RT is encrypted or not, and if encrypted which one of the encryption keys EK2 has been used, a second decryption unit 400 coupled to the frame buffer 200, the buffer tile encryption status memory 210 and the key storage 700 to obtain decrypted rendered tiles DRT, an output 2 for supplying the decrypted rendered tiles DRT and if present the rendered tiles RT not encrypted, to a display controller 500.

In an embodiment, the second decryption unit 400 is arranged for decrypting the encrypted rendered tiles ERT stored in the frame buffer 200 in accordance with the associated buffer tile status data ST2.

In an embodiment the 3D graphics system further comprises a further decryption unit 305 for decrypting the encrypted rendered tiles ERT stored in the frame buffer 200 in accordance with the associated buffer tile status data ST2 to obtain decrypted stored tiles DST and wherein the render unit 302 is arranged for re-rendering the decrypted stored tiles DST into the re-rendered tiles RRT, and wherein the encryption unit 304 is arranged for encrypting the re-rendered tiles RRT into encrypted re-rendered tiles ERRT, for storing the encrypted re-rendered tiles ERRT in the frame buffer 200 and for storing the associated buffer tile status data ST2 in the buffer tile encryption status storage 210, the buffer tile status data ST2 indicates whether an associated one of the re-rendered tiles RRT is encrypted or not, and if encrypted which one of the encryption keys EK2 has been used, the second decryption unit 400 is arranged for decrypting the encrypted re-rendered tiles ERRT stored in the frame buffer 200 in accordance with the associated buffer tile status data ST2 to obtain the decrypted rendered tiles DRT.

Figure 2:
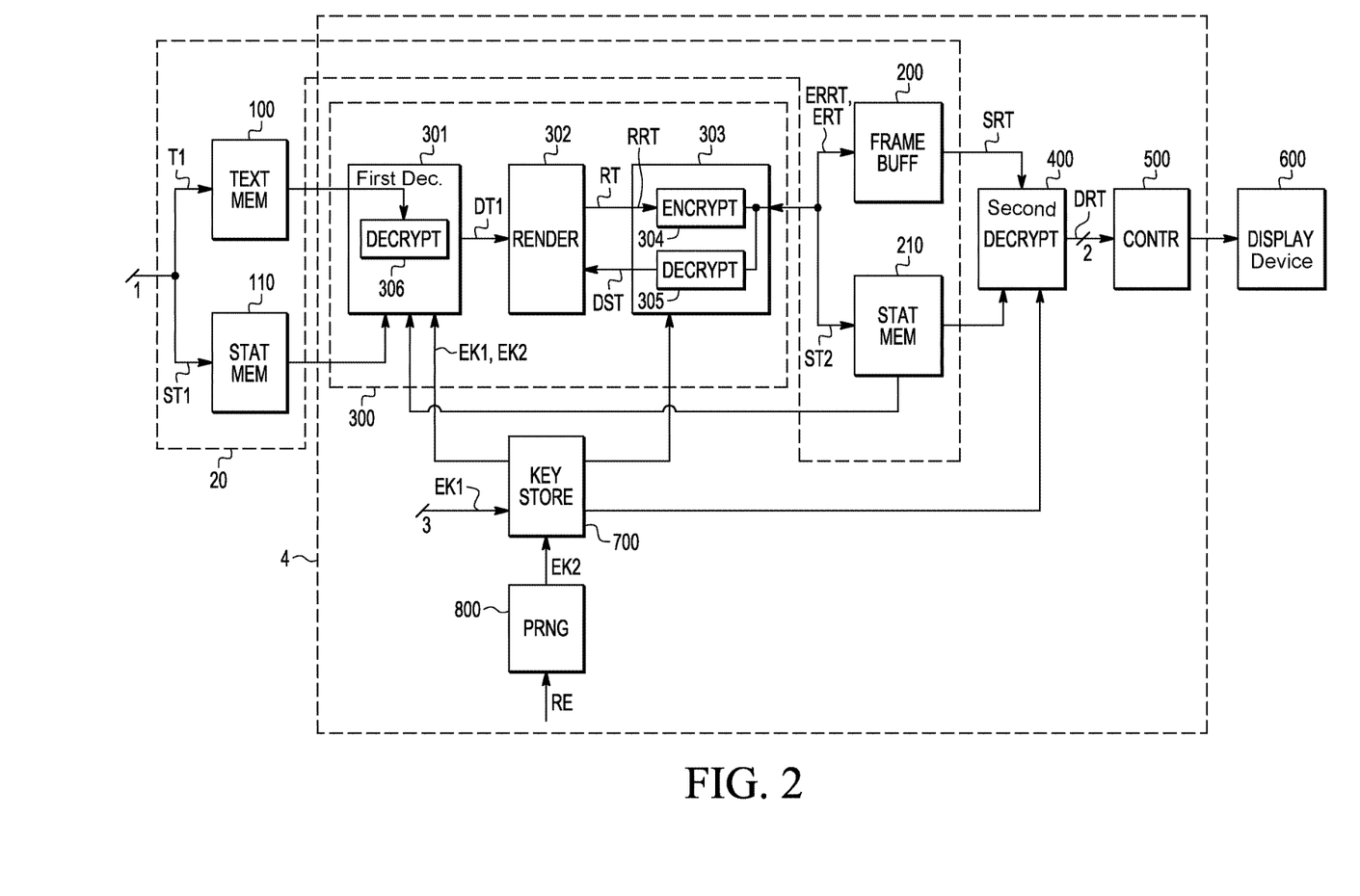

In an embodiment the first decryption unit 301 is arranged for also decrypting the encrypted rendered tiles ERT stored in the frame buffer 200 in accordance with the associated buffer tile status data ST2 to obtain decrypted stored tiles DST and wherein the render unit 302 is arranged for re-rendering the decrypted stored tiles DST into the re-rendered tiles RRT, and wherein the encryption unit 304 is arranged for encrypting the re-rendered tiles RRT into encrypted re-rendered tiles ERRT, for storing the encrypted re-rendered tiles ERRT in the frame buffer 200 and for storing the associated buffer tile status data ST2 in the buffer tile encryption status storage 210, the buffer tile status data ST2 indicates whether an associated one of the re-rendered tiles RRT is encrypted or not, and if encrypted which one of the encryption keys EK2 has been used, the second decryption unit 400 is arranged for decrypting the encrypted re-rendered tiles ERRT stored in the frame buffer 200 in accordance with the associated buffer tile status data ST2 to obtain the decrypted rendered tiles DRT. In this embodiment, the first decryption unit 301 needs access to the keys EK2 and to the buffer tile encryption status storage 210 as is shown in FIG. 2.

The texture tiles T1 which are stored in the texture storage 100 and the associated texture tile status data ST1 which is stored in the texture tile encryption status storage 110 may be produced on a developers PC which is used to generate the graphic data comprising objects and corresponding textures. For example, the graphic data may represent information produced by a vehicle or obtained about the ambient. This graphic data is displayed in the vehicle for example as a feedback to the driver. The information may be an instrument, such as for example a speedometer, a revolution counter, a temperature indicator of a cooling liquid or of the motor oil, or any other information of the car, such as for example warning symbols. The information may be information indicating a situation in the surrounding of the vehicle, for example the outside temperature sensed by the car or obtained from a provider, or the distance to obstacles. The instruments may be represented as analogue structures which may be clock shaped or as digital structures. The information may be a cluster of such instruments. The information may contain warning symbols or any other information. The vehicle may be any road, air or water vehicle. Although for clarity, in the now following, the 3D graphics system is elucidated when used in a vehicle, for example in a car, the invention is not limited to a 3D graphics system in a car or vehicle and may be implemented in any application in which graphic assets need to be protected against copying.

The owner of the graphic assets may want to protect his graphic assets and derived results thereof. For example, the graphic assets may comprise a logo, or the needles or scales of the instruments used in the graphic data which are to be displayed in their source form wherein they are not combined with anything else. For example, these graphic assets are not blended over a background. Derived results may be the final graphics displayed based on the use of the graphic assets.

The texture to be displayed is composed of tiles of textures which are also referred to in the now following as texture tiles. The reference T1 may refer to the set of texture tiles or to a particular one of the texture tiles. The texture tiles may be any N×M matrix of texture data pixels enabling the texture to be subdivided in at least two texture tiles. In an embodiment, the tiles may consist of 4×4 or 8×8 texture data pixels which are represented by a word of bits, for example 8, 16, 32 or 64 bits.

The skilled person will readily understand that the 3D graphics system may use the tile approach in a very flexible manner. For example, the 3D graphics system may process only a single texture or a plurality of different textures, all the textures may be subdivided in texture tiles which are all encrypted or only a subset of the textures tiles of the same texture may be encrypted. The encryption of the texture tiles of one or more of the textures may be skipped, or particular textures may not be subdivided into texture tiles. In the context of displaying information in a vehicle, for example, different textures may be available for day and night use.

For every texture tile T1, associated texture tile status data ST1 is stored in the texture tile encryption status storage 110. The reference ST1 may refer to the set of texture tile status data ST1 associated with the set of texture tiles T1 of a particular texture or to a particular one of the set of texture tile status data ST1, wherein this particular one is associated with the corresponding one of the texture tiles T1. The texture tile status data ST1 indicates whether the associated texture tile T1 is encrypted or not. Additionally, if a texture tile T1 is encrypted, the texture tile status ST1 indicates which encryption key EK1 is used for encrypting this texture tile T1.

In an embodiment the encryption keys EK1 associated with the encrypted tiles T1 of texture data are pre-stored in the key storage 700. These stored encryption keys EK1 are the same keys as used by the owner on the developer PC when generating the encrypted tiles T1 of texture data which represent the graphic assets of the owner. In the 3D graphics system, these encryption keys are used to decrypt the encrypted texture tiles T1. In an embodiment, at least two different encryption keys EK1 are used for different ones of the tiles T1 of texture data. The use of multiple different keys EK1 to encrypt different texture tiles has the advantage over the prior art UK patent application GB2379299A that the protection against copying of the graphic assets is improved. Knowing one or a subset of the keys EK1 is not sufficient to enable to reconstruct a one to one copy of the graphic assets. It is not mandatory that every different texture has a different key EK1. In an embodiment, the textures are grouped, one group uses either one key A or a plurality of keys AA and the other group uses either one key B or a plurality of keys BB to encrypt and decrypt the respective texture tiles. An application example would be graphic assets originating from different suppliers, such as for example an infotainment system that has multiple applications which are from different suppliers. Each one of the suppliers could protect his graphic assets with his own key or with his own set of keys. Every supplier could have his private key for this, such that the one supplier is not able to decrypt the assets of another supplier.

In another embodiment, the 3D graphics system has an input for receiving the encryption keys EK1 associated with the encrypted tiles T1 of texture data, the encryption keys EK1 being encrypted by a public key for which the associated secret key SK is stored in 3D graphics system. The texture data is still protected even if the public key or one (or some) of the encryption keys EK1 would be known to a third party. In an embodiment, the encryption keys EK1 associated with the encrypted tiles T1 of texture data are received at input 3 via a separate secure link.

The first decryption unit 301 is coupled to the texture storage 100 to retrieve the texture tiles T1, to the texture tile encryption status storage 110 to retrieve the tile status data ST1 associated with the these texture tiles T1, and to the key storage 700 to retrieve the encryption keys EK1 indicated in the texture tile encryption status storage 110. The first decryption unit 301 decrypts the encrypted texture tiles T1 to obtain decrypted texture tiles DT1. The decrypted texture tiles DT1 are considered to also contain the texture tiles T1 which were received as not encrypted tiles and are passed through or along the first decryption unit 301.

The render unit 302 renders the decrypted texture tiles DT1 into rendered tiles RT which may be pixel data to be displayed on a display device 600, or which may be texture data to be processed again by the render unit 302. In both cases the rendered tiles RT represent rendered data to be displayed directly or after further processing on the display device 600.

The encryption unit 304 receives the rendered tiles RT and encrypts at least one of the rendered tiles RT using encryption keys EK2 to obtain encrypted rendered tiles ERT which are stored in the frame buffer 200. Also rendered tiles RT which were not encrypted may be stored in the frame buffer 200. This combination of encrypted and not encrypted rendered tiles RT which is stored in the frame buffer 200 is also referred to as stored rendered tiles SRT. The buffer tile encryption status storage 210 is used to store status information for each stored rendered tile SRT to indicate whether this tile is encrypted or not. Further, for each one of the encrypted rendered tiles RT the associated key EK2 is stored in the buffer tile encryption status storage 210.

In an embodiment, the 3D graphics system comprises a pseudo-number generator 800 for generating the encryption keys EK2 associated with the encrypted rendered tiles ERT. In the embodiment shown in FIG. 1, the pseudo-number generator 800 is coupled with the key storage 700 to store the generated keys EK2 in the key storage 700. The encryption unit 304 retrieves the encryption keys EK2 from the key storage 700. Alternatively, in another embodiment the pseudo-number generator 800 is coupled to the encryption unit 304 to directly provide the encryption keys EK2 to the encryption unit 304 and the encryption unit 304 stores the encryption keys EK2 used in the key storage 700 and in the buffer tile encryption status storage 210. In this embodiment, the encryption keys EK2 are also provided to the second decryption unit 400 to enable the decryption. In an embodiment, the pseudo-random number generator 800 is configured for generating the encryption keys EK2 in response to a reset RE of the 3D graphics system.

In an embodiment of the 3D graphics system, the encryption keys EK2 associated with the at least one of the encrypted rendered tiles ERT are pre-stored in the key storage 700.

In an embodiment, at least two different encryption keys EK2 are used for different ones of the rendered tiles RT. The use of multiple different keys EK2 to obtain encrypted rendered tiles ERT has the advantage that the protection against copying of the graphic assets is improved. Knowing one or a subset of the keys EK2 is not sufficient to enable to reconstruct a one to one copy of the graphic assets. It is not mandatory that every different encrypted rendered tile ERT is encrypted with a different key EK2.

In general, encrypting the graphic data stored in the frame buffer 200 has the advantage that the graphic data in the frame buffer 200 cannot be copied without knowing the associated encryption key. In the embodiments described earlier in which tiles are encrypted using different encryption keys EK2 it becomes even more difficult to decrypt the data stored in the frame buffer 200 because all the different encryption keys EK2 have to be retrieved. It has to be noted that the encryption keys EK2 are only for internal use by the encryption unit 303 and the second decryption unit 400. Consequently, using encryption keys EK2 which are generated by an internal pseudo-random number generator 800 in response to a trigger which may be the reset RE of the 3D graphics system makes it very difficult to find out which keys EK2 are used for the encryption of the stored rendered tiles SRT. With internal use is meant: within the 3D graphics system, without requiring any connection to the outside world of the 3D graphics system.

The second decryption unit 400 is coupled to the frame buffer 200 to retrieve the stored rendered tiles SRT. The stored rendered tiles SRT in the frame buffer 200 comprise the encrypted rendered tiles ERT which are the rendered tiles RT which are encrypted by the encryption unit 304 using an associated one of the encryption keys EK2. The stored rendered tiles SRT may comprise not encrypted rendered tiles RT. Further, the second decryption unit 400 is coupled to the buffer tile encryption storage 210 to retrieve the stored status information ST2 which indicates whether the stored rendered tile SRT is encrypted or not and if yes which encryption key EK2 is used. If the status information ST2 indicates that the stored rendered tile SRT is encrypted, the decryption unit 400 will retrieve the indicated associated encryption key EK2 from the key storage 700 and decrypt the stored rendered tile SRT. The second decryption unit 400 supplies the decrypted rendered tiles DRT which comprise decrypted stored encrypted rendered tiles ERT (which are the rendered tiles RT which were stored after encryption) and, if applicable, not-decrypted stored rendered tiles RT (which are the rendered tiles RT which were stored without being encrypted, if any).

In the embodiment shown in FIG. 1, the 3D graphics system comprises a display device 600 and a display controller 500 coupled to the output 2 for receiving the decrypted rendered tiles DRT and coupled to the display device 600 for supplying display signals to the display device 600 to display the decrypted rendered tiles DRT. Thus in this embodiment, the render unit 302 supplies the rendered tiles ERT which comprise pixel data to be displayed on the display device 600 and the encryption unit 304 supplies the encrypted rendered tiles ERT which comprise encrypted pixel data. The display controller 500 is coupled to the second decryption unit 400 to supply the decrypted rendered tiles DRT to the display device 600. In this embodiment, the render unit 302 renders the decrypted texture tiles DT1 into pixels tiles which comprise pixel data of pixels to be displayed on the display device 600. The display device 600 may be of any kind, for example based on LCD, OLED, or E-ink display technology. The display device 600 may be a matrix display or segment display or any other pixel or segment addressable display. Another embodiment wherein the stored rendered tiles SRT are textures is elucidated with respect to FIG. 2.

In an embodiment, the 3D graphics system comprises a memory chip 20 comprising the texture storage 100, the texture tile encryption status storage 110, the frame buffer 200 and the buffer tile encryption status storage 210. In this embodiment all the data storage is concentrated in a single memory chip 20. Alternatively, the different data may be stored in different memories which might be divided over a plurality of memory chips or which may be partly or completely integrated together with other functions of the 3D graphics system. It is irrelevant for the functioning of the 3D graphics system how the data storage is arranged. In an embodiment wherein the data storage is concentrated in a single memory chip 20 inside the 3D graphics system, without any possibility for external access and without storing the encryption keys EK1 and EK2 in this single memory chip, the data will be protected very well against copying. The memory chip 20 may comprise any memory suitable to be used together with a renderer for graphic information, for example a DDR memory.

In an embodiment, the 3D graphics system comprises a Graphics Processor Unit 300 comprising the first decryption unit 301, the render unit 302 and the encryption unit 304. A GPU 300 which comprises a render unit is as such readily available. By combining the first decryption unit 301 and the encryption unit 304 with the GPU 300, the processing unit 303 of the GPU 300 can be used to control the data flow required for the decryption and encryption. The processing unit 303 comprises the encryption unit 304. Alternatively, the 3D graphics system may comprise a separate CPU (not shown) for controlling the data flow in the 3D graphics system.

In an embodiment, the 3D graphics system comprises a processing chip 4 comprising the key storage 700, the Graphics Processor Unit 300, and the second decryption unit 400. By combining all these functions in a single chip 4 (shown in FIG. 2), it becomes very difficult to tamper with the data used inside the chip 4. It is an advantage of such a chip that the encryption keys EK2 are not accessible at all because they are only used within the chip 4. In an embodiment, the processing chip 4 comprises the display controller 500.

In an embodiment the tiles T1 of texture data TD are data-compressed and the first decryption unit 301 comprises a data-decompression unit 306 for decompressing the data-compressed tiles T1 of texture data. The graphic data assembled by the owner may be data compressed, which in the context of this invention means that the tiles T1 of texture data are data compressed. Any compression algorithm may be used. Block compression algorithm have the advantage that the tiles T1 can be considered to be the blocks to be compressed. Alternatively or additionally, the rendered tiles stored in the frame buffer 200 may be data compressed.

In an embodiment, the tiles T1 of texture data TD are encrypted using a block cipher algorithm. The tiles T1 are the blocks to be encrypted. For example AES may be used as the block cipher.

FIG. 2 schematically shows another example of an embodiment of a 3D graphics system.

The 3D graphics system schematically shown in FIG. 2 only differs from the 3D graphics system schematically shown in FIG. 1 in that the processing unit 303 further comprises a decryption unit 305 and that the encrypted rendered tiles ERT which are stored in the frame buffer 200 after the rendering are again rendered to change the pixel data to be displayed. The decryption unit 305 decrypts the encrypted rendered tiles ERT which were already stored in the frame buffer 200 after a first render operation to obtain decrypted stored tiles DST. The render unit 302 now renders the decrypted stored tiles DST into re-rendered tiles RRT which are pixel tiles to be displayed on the display 600. Thus, the decryption unit 305 should have access to the earlier stored data (the encrypted rendered tiles ERT) in the frame buffer 200, to the associated buffer encryption status storage 210, and the keys EK2 in the key storage 700. The re-rendered tiles RRT generated by the render unit 302 may be encrypted by the encryption unit 304 before being stored into the frame buffer 200. These re-rendered tiles RRT which are encrypted are the encrypted re-rendered tiles ERRT. The pixel tiles stored in the frame buffer may be all encrypted but may alternatively comprise both encrypted re-rendered tiles ERRT and not encrypted re-rendered tiles RRT. The encrypted re-rendered tiles ERRT stored in the frame buffer are decrypted by the second decryption unit 400 and are forwarded to the display controller 500 to be displayed on the display device 600. A situation in which repeated rendering occurs is for example a rendered scene which is not directly shown on the display device 600 but which is shown in a graphic user interface such as for example a "coverflow". This "coverflow" is the data stored in the frame buffer 200 after the first rendering operation (an example of such a coverflow is used by Apple in iTunes). The user can select one cover out of the "coverflows" which then after the second rendering operation will be displayed full screen. The data stored in the frame buffer 200 may be rendered more than 2 times.

In an embodiment, at least two different encryption keys EK2 are used for different ones of the re-rendered tiles RRT. The keys EK2 used by the decryption unit 305 may be pre-stored or internally generated. The use of multiple different keys EK2 to obtain encrypted re-rendered tiles ERRT has the advantage that the protection against copying of the graphic assets is improved. Knowing one or a subset of the keys EK2 is not sufficient to enable to reconstruct a one to one copy of the graphic assets. It is not mandatory that every different encrypted re-rendered tile ERRT is encrypted with a different key EK2.

In an embodiment, the 3D graphics system comprises a Graphics Processor Unit 300 comprising the first decryption unit 301, the render unit 302, the encryption unit 304 and the decryption unit 305.

In an embodiment, the 3D graphics system comprises a pseudo-number generator 800 for generating the encryption keys EK2 associated with the encrypted re-rendered tiles ERRT.

In an embodiment of the 3D graphics system, the encryption keys EK2 associated with the at least one of the encrypted re-rendered tiles ERRT are pre-stored in the key storage 700.

Figure 3:
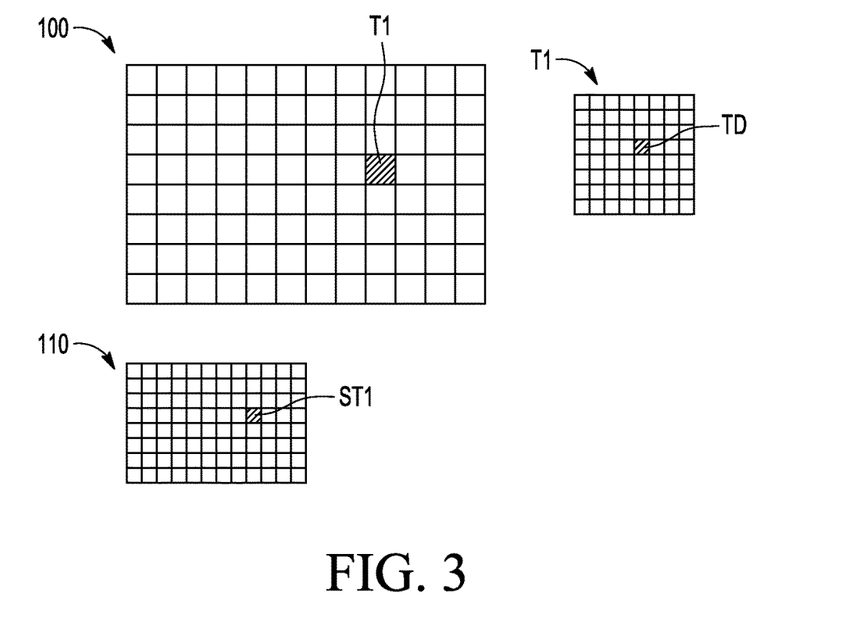

FIG. 3 schematically shows a structure of a texture storage and its associated tile encryption status storage. The texture storage 100 comprises texture tiles T1. In FIG. 3 one of the texture tiles T1 is indicated by hatching. The texture tile T1 comprises texture data or texture pixels TD of which one is hatched. In an embodiment, the texture storage 100 is a memory area required to store the texture data words representing the complete texture. For example, the texture data words are 8, 16, 32 or 64 bit data words. The texture storage 100 is divided into K by L texture tiles T1 of M by N texture data words representing the texture data of this tile T1. M and N are selected to optimize the processing speed of the GPU 300. For example M by N is 4 by 4 or 8 by 8. Subsequently, K and L are selected to fit the resolution of the display device 600. The texture tile encryption status storage 110 stores for every one of the K by L texture tiles T1 status information ST1 which indicates whether the corresponding tile T1 is encrypted or not and if the corresponding tile T1 is encrypted which one of the encryption keys EK1 is used.

Figure 4:
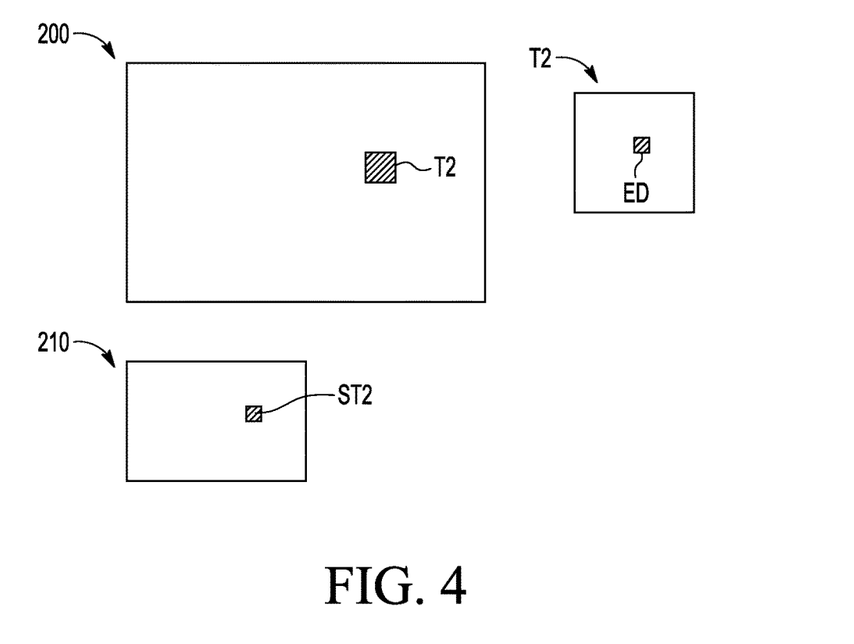

FIG. 4 schematically shows a structure of a frame buffer and its associated buffer tile encryption status storage. The frame buffer 200 comprises stored rendered tiles T2. In FIG. 4 one of the stored rendered tiles T2 is indicated by hatching. The stored rendered tile T2 comprises texture data or texture pixels TD (as has been elucidated with respect to the embodiment shown in FIG. 1), or pixel data to be displayed (as has been elucidated with respect to the embodiment shown in FIG. 2). In an embodiment, the frame buffer 200 is a memory area required to store the rendered tiles T2 representing the complete textures or the complete display data. In an embodiment, the frame buffer 200 is divided into K by L texture or pixel tiles T2 of M by N texture data words representing the texture data of the tile T2, or of M by N pixel data words representing the pixel data of the tile T2. M and N are selected to optimize the processing speed of the GPU 300 and depend on the internal storage capacity of the display controller 500. For example M by N is 4 by 4 or 8 by 8 data words. Subsequently, K and L are selected to fit the resolution of the display device 600. The buffer tile encryption status storage 210 stores for every one of the K by L texture or pixel tiles T2 status information ST2 indicating whether the corresponding tile T2 is encrypted or not and if the corresponding tile T2 is encrypted which one of the encryption keys EK2 is used. The dimensions of the texture storage and the frame buffer need not be equal. Also the dimensions of the texture tiles T1 and the texture or pixel tiles T2 may differ. Or said differently, M and N as well as K and L may be different for the texture storage 100 and the buffer storage 200. Even inside the texture storage 100 the textures may have different sizes. The same is valid for the frame buffer 200, for example if two displays use a single render unit 302 only.

Figure 5:
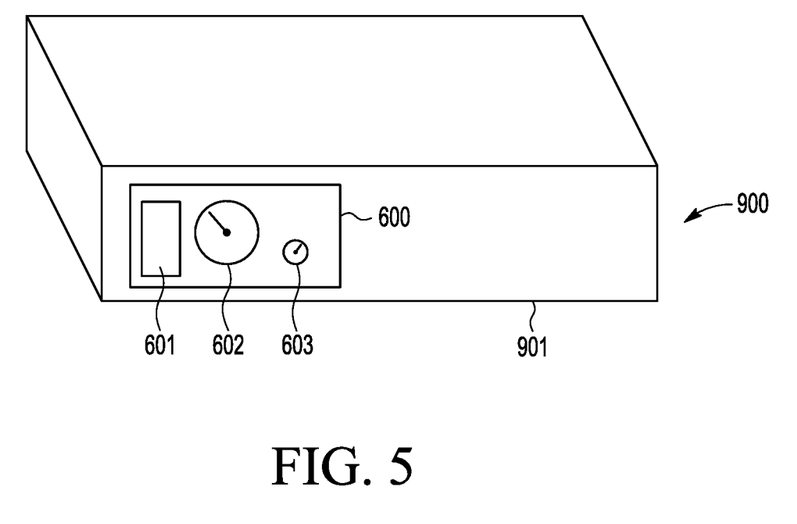

FIG. 5 schematically shows a graphically generated instrument cluster in a vehicle. The 3D graphics system may be used in an instrument display system 600 for a vehicle 900. The vehicle may comprise the instrument display system 600 which comprises the 3D graphics system. FIG. 5 is a very schematically and incomplete drawing of a car to clearly show the instrument cluster comprising the graphical representations 601, 602 and 603 displayed on the display device 600. In this example, the graphical representation 601 depicts an area of the display where text information or graphical objects are shown. The graphical representation 601, may for example indicate a warning about a property of the car, for example a too low level of oil, or a pictogram indicating the present status of the road, or an ambient temperature, or a pictogram indicating a dangerous low temperature at which the road may be slippery. Further, only by way of example, the graphical representation 602 and 603 may show the actual speed of the car and the actual number off revolutions per minute of the motor of the car. It is off course up to the owner of the graphical assets which graphical information will be shown and which textures are used. Only by way of example, FIG. 5 shows that the display device 600 is arranged in the dashboard 901 of the car. The display device 600 need not be positioned in the dashboard 901, any other position visible to the driver or passengers or both may be possible. The display device 600 may have any suitable shape fitting the interior design of the car and does not need to be a rectangle.

In operation, the 3D graphics system provides a method of generating 3D graphics comprising: storing encryption keys EK1, EK2, receiving a texture comprising tiles T1 of texture data TD, receiving texture tile status data ST1, storing the tiles T1 of texture data, storing the texture tile status data ST1 indicating whether an associated one of the tiles T1 of texture data is encrypted or not and if encrypted which one of the encryption keys EK1 has been used, first decrypting encrypted ones of the tiles T1 of texture data in accordance with the associated ones of the encryption keys EK1 to obtain decrypted tiles DT1 of texture data, rendering the decrypted tiles DT1 of texture data into rendered tiles RT, encrypting at least one of the rendered tiles RT to obtain encrypted rendered tiles ERT, storing the encrypted rendered tiles ERT and if present the rendered tiles RT not encrypted in the frame buffer 200, storing the associated buffer tile status data ST2 indicating whether an associated one of the rendered tiles RT is encrypted or not, and if encrypted which one of the encryption keys EK2 has been used, a second decrypting to obtain decrypted rendered tiles DRT, supplying the decrypted rendered tiles DRT and if present the rendered tiles RT not encrypted to a display controller 500, and wherein either: (i) the second decrypting decrypts the encrypted rendered tiles ERT stored in the frame buffer 200 in accordance with the associated buffer tile status data ST2, (ii) the method further comprises third decrypting decrypting the encrypted rendered tiles ERT stored in the frame buffer 200 in accordance with the associated buffer tile status data ST2 to obtain decrypted stored tiles DST, wherein the rendering re-renders the decrypted stored tiles DST into the re-rendered tiles RRT, and the encrypting encrypts the re-rendered tiles RRT into encrypted re-rendered tiles ERRT, stores the encrypted re-rendered tiles ERRT in the frame buffer 200 and stores the associated buffer tile status data ST2 now indicating whether an associated one of the re-rendered tiles RRT is encrypted or not, and if encrypted which one of the encryption keys EK2 has been used, and wherein the second decryption decrypts the encrypted re-rendered tiles ERRT stored in the frame buffer 200 in accordance with the associated buffer tile status data ST2 to obtain the decrypted rendered tiles DRT.

Figure 6:
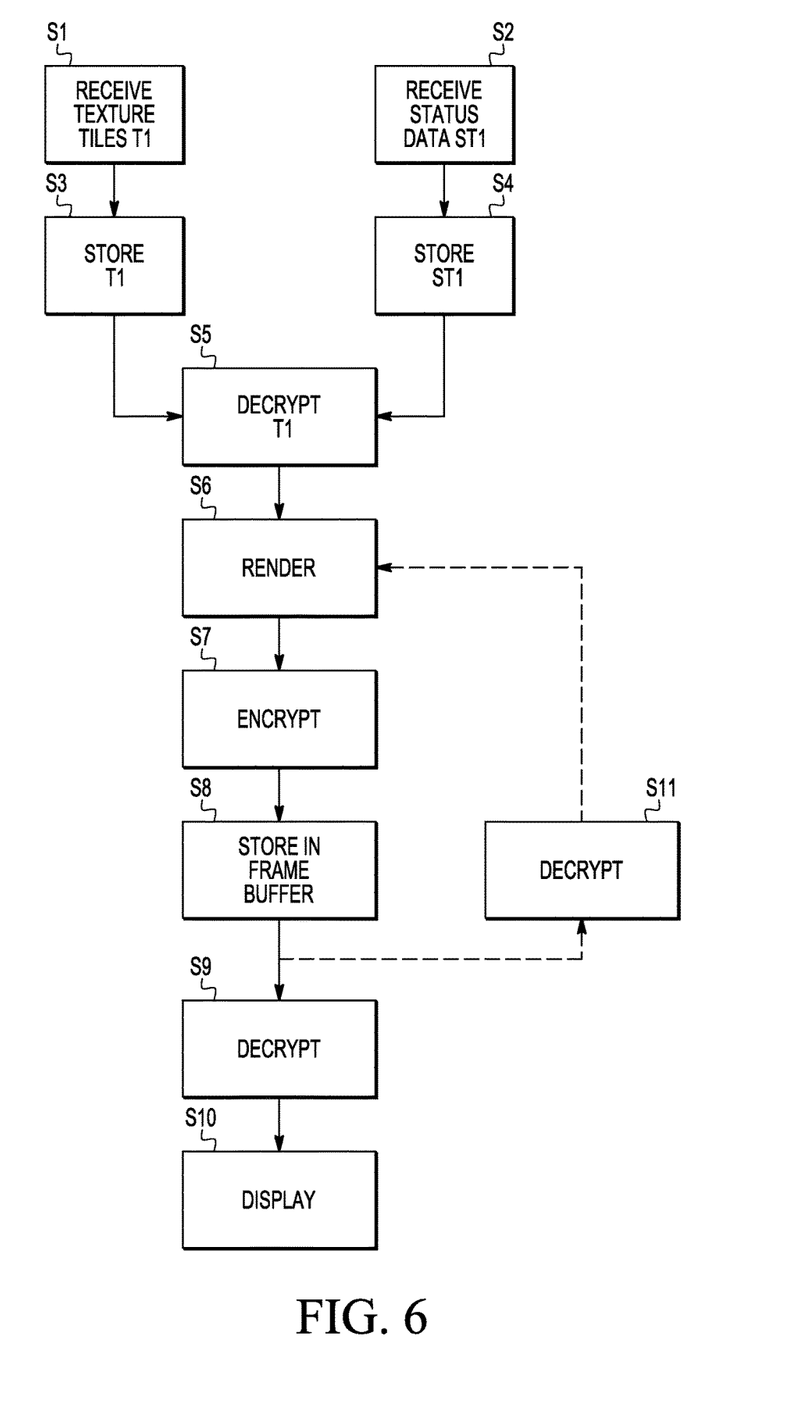

FIG. 6 schematically shows a flowchart for explaining the operation of an embodiment of the 3D graphics system. The texture tiles T1 are received at step S1 and is stored in the texture storage 100 in step S3. The texture tile status data ST1 is received in step S2 and is stored in the texture tile encryption status storage 110. The texture tile status data ST1 may be actually received together with the texture tiles T1. Alternatively, the texture tile status data ST1 may be pre-stored. In step S5, the texture tiles T1 which were encrypted are decrypted by using the associated ones of the stored keys EK1 in the texture tile status data ST1. The render step S6 renders the texture tiles which are now all not encrypted and encrypts in step S7 at least a subset of the resulting rendered tiles RT and finally stores in step 8 the encrypted rendered tiles (and if present the not encrypted rendered files) as stored tiles SRT in the frame buffer 200. After decrypting in step S9 the encrypted files stored in the frame buffer 200 the data is ready to be displayed on a display in step S10.

Optionally, the tiles SRT stored in the frame buffer 200 may be one time or more times be re-rendered using step S6 again. Before being able to re-render the tiles SRT stored in the frame buffer 200, first in step S11, the encrypted ones of the stored files SRT are decrypted. After the optional re-rendering (one or more times) has been finished, the process proceeds with step S9.

Anyhow, as long as the information stored in the frame buffer 200 should be displayed, the steps S9 and S10 must be active. The re-rendered tiles may overwrite the tiles in the frame buffer, but alternatively may be first stored in a separate part of the frame buffer 200 before being copied to the part of the frame buffer which is used by step S9.

Figure 7:
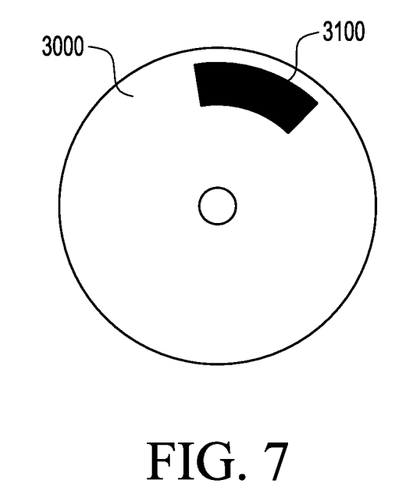

FIG. 7 schematically shows a data carrier which comprises instructions for causing a programmable apparatus to perform the operations of the embodiment shown in FIG. 6. A computer program product 3100 comprises instructions for causing a programmable apparatus to perform the method as discussed with respect to FIG. 6.

A non-transitory tangible computer readable storage medium 3000 comprises data loadable in a programmable apparatus, the data representing instructions executable by the programmable apparatus, said instructions comprising: first decrypting encrypted ones of tiles of texture data in accordance with associated ones of encryption keys to obtain decrypted tiles of texture data, rendering the decrypted tiles of texture data into rendered tiles, encrypting at least one of the rendered tiles to obtain encrypted rendered tiles, storing the encrypted rendered tiles and if present the rendered tiles not encrypted in a frame buffer, storing the associated buffer tile status data indicating whether an associated one of the rendered tiles is encrypted or not, and if encrypted which one of the encryption keys has been used, a second decrypting to obtain decrypted rendered tiles.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the scope of the invention as set forth in the appended claims. For example, the operation of the functional units shown in FIGS. 1 and 2 may be completely or partly obtained by a suitably programmed CPU or by a dedicated processor. The invention is not limited to physical devices or units implemented in non-programmable hardware but can also be applied in programmable devices or units able to perform the desired device functions by operating in accordance with suitable program code, or any combination thereof. However, other modifications, variations and alternatives are also possible. The specifications and drawings are, accordingly, to be regarded in an illustrative rather than in a restrictive sense.

Because the apparatus implementing the present invention is, for the most part, composed of units known to those skilled in the art, details have not been explained in any greater extent than that considered necessary, for the understanding and appreciation of the underlying concepts of the present invention and in order not to obfuscate or distract from the teachings of the present invention.

Furthermore, those skilled in the art will recognize that boundaries between the functional units are merely illustrative. The functionality of multiple units may be combined into a single unit, and/or the functionality of a single unit may be distributed in additional units. Moreover, alternative embodiments may include multiple instances of a particular unit.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A 3D graphics system comprising:
a key storage configured to store encryption keys,
an input for receiving a texture comprising tiles of texture data and for receiving texture tile status data,
a texture storage configured to store the tiles of texture data,
a texture tile encryption status storage configured to store the texture tile status data indicating whether an associated one of the tiles of texture data is encrypted or not and if encrypted which one of the encryption keys has been used,
a first decryption unit coupled to the texture storage, to the first tile encryption status storage and to the key storage and configured to decrypt encrypted tiles of texture data in accordance with the associated ones of the encryption keys and to output decrypted tiles of texture data,
a render unit coupled to the first decryption unit configured to render the decrypted tiles of texture data into rendered tiles,
an encryption unit coupled to the render unit, to a frame buffer and to a buffer tile encryption status storage configured to receive at least one of the rendered tiles as input, to encrypt the at least one of the rendered tiles, and to store the encrypted rendered tiles in the frame buffer and to store an associated buffer tile status data in the buffer tile encryption status storage, the buffer tile status data indicates whether an associated one of the rendered tiles is encrypted or not, and if encrypted which one of the encryption keys has been used,
a second decryption unit coupled to the frame buffer, the buffer tile encryption status memory and the key storage configured to receive encrypted rendered tiles as input, to decrypt the encrypted rendered tiles, and to output decrypted rendered tiles,
an output for supplying the decrypted rendered tiles and if present the rendered tiles not encrypted, to a display controller.

2. The 3D graphics system according to claim 1, wherein the second decryption unit is arranged for decrypting the encrypted rendered tiles stored in the frame buffer in accordance with the associated buffer tile status data.

3. The 3D graphics system according to claim 1, wherein the 3D graphics system further comprises a further decryption unit configured to decrypt the encrypted rendered tiles stored in the frame buffer in accordance with the associated buffer tile status data to obtain decrypted stored tiles and wherein the render unit is arranged for re-rendering the decrypted stored tiles into the re-rendered tiles, and wherein the encryption unit is arranged for encrypting the re-rendered tiles into encrypted re-rendered tiles,to store the encrypted re-rendered tiles in the frame buffer and to store the associated buffer tile status data in the buffer tile encryption status storage, the buffer tile status data indicates whether an associated one of the re-rendered tiles is encrypted or not, and if encrypted which one of the encryption keys has been used, the second decryption unit is arranged for decrypting the encrypted re-rendered tiles stored in the frame buffer in accordance with the associated buffer tile status data to obtain the decrypted rendered tiles.

4. The 3D graphics system according to claim 1, wherein the decryption unit is arranged for decrypting the encrypted rendered tiles stored in the frame buffer in accordance with the associated buffer tile status data to obtain decrypted stored tiles and wherein the render unit is arranged for re-rendering the decrypted stored tiles into the re-rendered tiles, and wherein the encryption unit is arranged for encrypting the re-rendered tiles into encrypted re-rendered tiles, for storing the encrypted re-rendered tiles in the frame buffer and for storing the associated buffer tile status data in the buffer tile encryption status storage, the buffer tile status data indicates whether an associated one of the re-rendered tiles is encrypted or not, and if encrypted which one of the encryption keys has been used, the second decryption unit is arranged for decrypting the encrypted re-rendered tiles stored in the frame buffer in accordance with the associated buffer tile status data to obtain the decrypted rendered tiles.

5. The 3D graphics system according to claim 1, comprising a display device and a display controller coupled to the output for receiving the decrypted rendered tiles and coupled to the display device for supplying display signals to the display device to display the decrypted rendered tiles.

6. The 3D graphics system according to claim 1, wherein the encryption keys associated with the encrypted tiles of texture data are pre stored in the key storage.

7. The 3D graphics system according to claim 1, having an input for receiving the encryption keys associated with the encrypted tiles of texture data, the encryption keys being encrypted by a public key for which the associated secret key is stored in 3D graphics system.

8. The 3D graphics system according to claim 1, comprising a pseudo-number generator for generating the encryption keys associated with at least one of: the encrypted rendered tiles and the encrypted re-rendered tiles.

9. The 3D graphics system according to claim 8, wherein the pseudo-random number generator is configured for generating the encryption keys in response to a reset of the 3D graphics system.

10. The 3D graphics system according to claim 1, wherein the encryption keys associated with at least one of the encrypted rendered tiles and the encrypted re-rendered tiles are pre stored in the key storage.

11. The 3D graphics system according to claim 1, comprising a memory chip comprising the texture storage, the texture tile encryption status storage, the frame buffer and the buffer tile encryption status storage.

12. The 3D graphics system according to claim 1, comprising a Graphics Processor Unit comprising the first decryption unit, the render unit, the encryption unit and the second decryption unit.

13. The 3D graphics system according to claim 12, comprising a processing chip comprising the key storage, the Graphics Processor Unit, and the second decryption unit, or the key storage, the Graphics Processor Unit, the second decryption unit and the display controller.

14. The 3D graphics system according to claim 1, wherein the tiles of texture data are data-compressed and the first decryption circuit comprises a decompression unit for decompressing the data-compressed tiles of texture data.

15. The 3D graphics system according to claim 1, wherein at least two different encryption keys are used for at least one out of the group of: different tiles of texture data, different rendered tiles and different re-rendered tiles.

16. An instrument display system for a vehicle and comprising the 3D graphics system according to claim 1.

17. A vehicle comprising the instrument display system according to claim 16.

18. A method of generating 3D graphics comprising:
storing encryption keys,
receiving a texture comprising tiles of texture data,
receiving texture tile status data,
storing the tiles of texture data,
storing the texture tile status data indicating whether an associated one of the tiles of texture data is encrypted or not and if encrypted which one of the encryption keys has been used,
first decrypting encrypted tiles of texture data in accordance with the associated encryption keys to obtain decrypted tiles of texture data,
rendering the decrypted tiles of texture data into rendered tiles,
encrypting at least one of the rendered tiles to obtain encrypted rendered tiles,
storing the encrypted rendered tiles in the frame buffer,
storing an associated buffer tile status data indicating whether an associated one of the rendered tiles is encrypted or not, and if encrypted which one of the encryption keys has been used,
a second decrypting to obtain decrypted rendered tiles,
supplying the decrypted rendered tiles and if present the rendered tiles not encrypted to a display controller.

19. A non-transitory computer program product comprising instructions for causing a programmable apparatus to perform a method of claim 18.

20. A non-transitory tangible computer readable storage medium comprising data loadable in a programmable apparatus, the data representing instructions executable by the programmable apparatus, said instructions comprising:
first decrypting encrypted tiles of texture data in accordance with associated encryption keys to obtain decrypted tiles of texture data,
rendering the decrypted tiles of texture data into rendered tiles,
encrypting at least one of the rendered tiles to obtain encrypted rendered tiles,
storing the encrypted rendered tiles in a frame buffer,
storing an associated buffer tile status data indicating whether an associated one of the rendered tiles is encrypted or not, and if encrypted which one of the encryption keys has been used, and
decrypting encrypted rendered tiles to obtain decrypted rendered tiles.

* * * * *